(12) United States Patent
Chou et al.

(10) Patent No.: US 11,601,819 B2
(45) Date of Patent: Mar. 7, 2023

(54) ORCHESTRATION AND CONFIGURATION OF E2E NETWORK SLICES ACROSS 3GPP CORE NETWORK AND ORAN

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 16/912,945

(22) Filed: Jun. 26, 2020

(65) Prior Publication Data

US 2020/0329381 A1  Oct. 15, 2020

Related U.S. Application Data

(60) Provisional application No. 62/876,528, filed on Jul. 19, 2019.

(51) Int. Cl.
*H04W 16/10* (2009.01)
*H04W 84/04* (2009.01)

(52) U.S. Cl.
CPC .......... *H04W 16/10* (2013.01); *H04W 84/042* (2013.01)

(58) Field of Classification Search
CPC ..... H04W 16/00; H04W 16/10; H04W 28/00; H04W 28/02; H04W 28/0221; H04W 84/042
See application file for complete search history.

(56) References Cited

U.S. PATENT DOCUMENTS 11,480,669 B2 * 10/2022 Keating ............... H04W 64/00
11,483,776 B1 * 10/2022 Wang .................. H04B 7/0408

* cited by examiner

*Primary Examiner* — Wayne H Cai
(74) *Attorney, Agent, or Firm* — Schwegman Lundberg & Woessner, P.A.

(57) ABSTRACT

Systems and methods for orchestration and configuration of end-to-end network slices across a 3GPP core network and ORAN are described. The network includes a NSMF that receives an AllocateNSI operation with attributes to allocate an NSI. The AllocateNSI operation includes an attributeListIn parameter that specifies network slice properties in a ServiceProfile to be supported by the NSI. The NSMF determines that a new NSI is to be created rather than using an existing NSI and that the new NSI is to contain a NSSI (RAN) and a NSSI (CN). The NSMF communicates with a NSSMF (RAN) and NSSMF (CN) to create the new NSI. The new NSI includes an O-CU-CP, O-CU-UP and O-DU VNFs, and an O-RU PNF for the NSSI (RAN), and UPF, AMF, and SMF VNFs for the NSSI (CN).

20 Claims, 7 Drawing Sheets

ORCHESTRATION AND CONFIGURATION OF E2E NETWORK SLICES ACROSS 3GPP CORE NETWORK AND ORAN

PRIORITY CLAIM

This application claims the benefit of priority under 35 U.S.C. 119(e) to U.S. Provisional Patent Application Ser. No. 62/876,528, filed Jul. 19, 2019, which is incorporated herein by reference in its entirety.

TECHNICAL FIELD

Embodiments pertain to radio access networks. Some embodiments relate to use of the Operations, Administration and Maintenance (OAM) architecture in Third Generation Partnership Project Long Term Evolution $5^{th}$ generation (5G) networks.

BACKGROUND

The use of 3GPP networks has increased due to both an increase in the types of devices user equipment (UEs) using network resources as well as the amount of data and bandwidth being used by various applications, such as video streaming, operating on these UEs. The 5G network, which like previous generations of networks includes both a radio-access network (RAN) and a core network (CN), has been developed to answer the enormous increase in number and diversity of communication devices. One manner of 5G network deployment to support various services uses network slicing. Each network slice is an end-to-end (E2E) connection covering both the RAN and the CN. However, the current relatively monolithic network and transport architecture in which network slicing is used is not sufficiently flexible or scalable to efficiently support a wide range of services.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
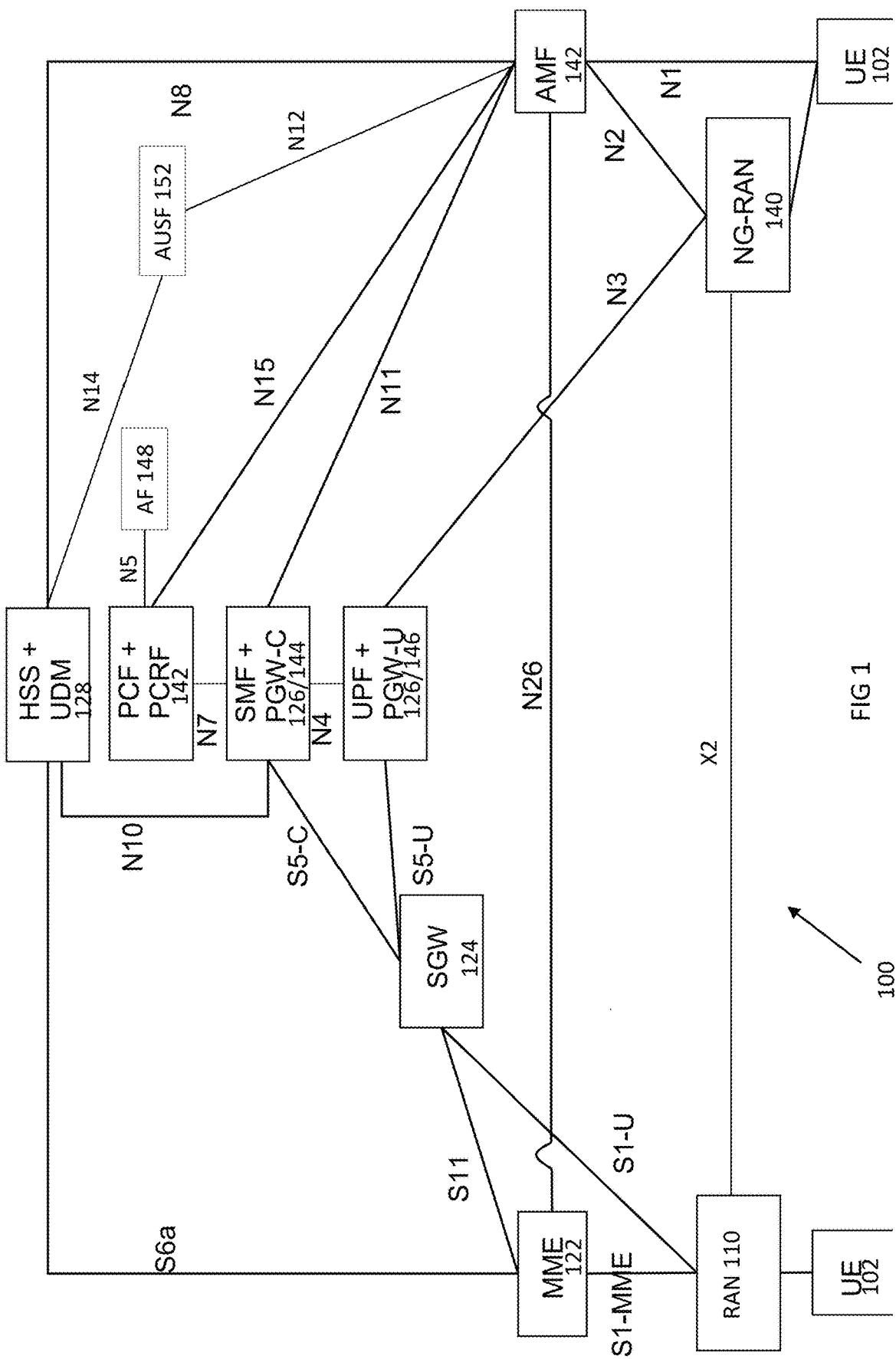
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or radio-access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
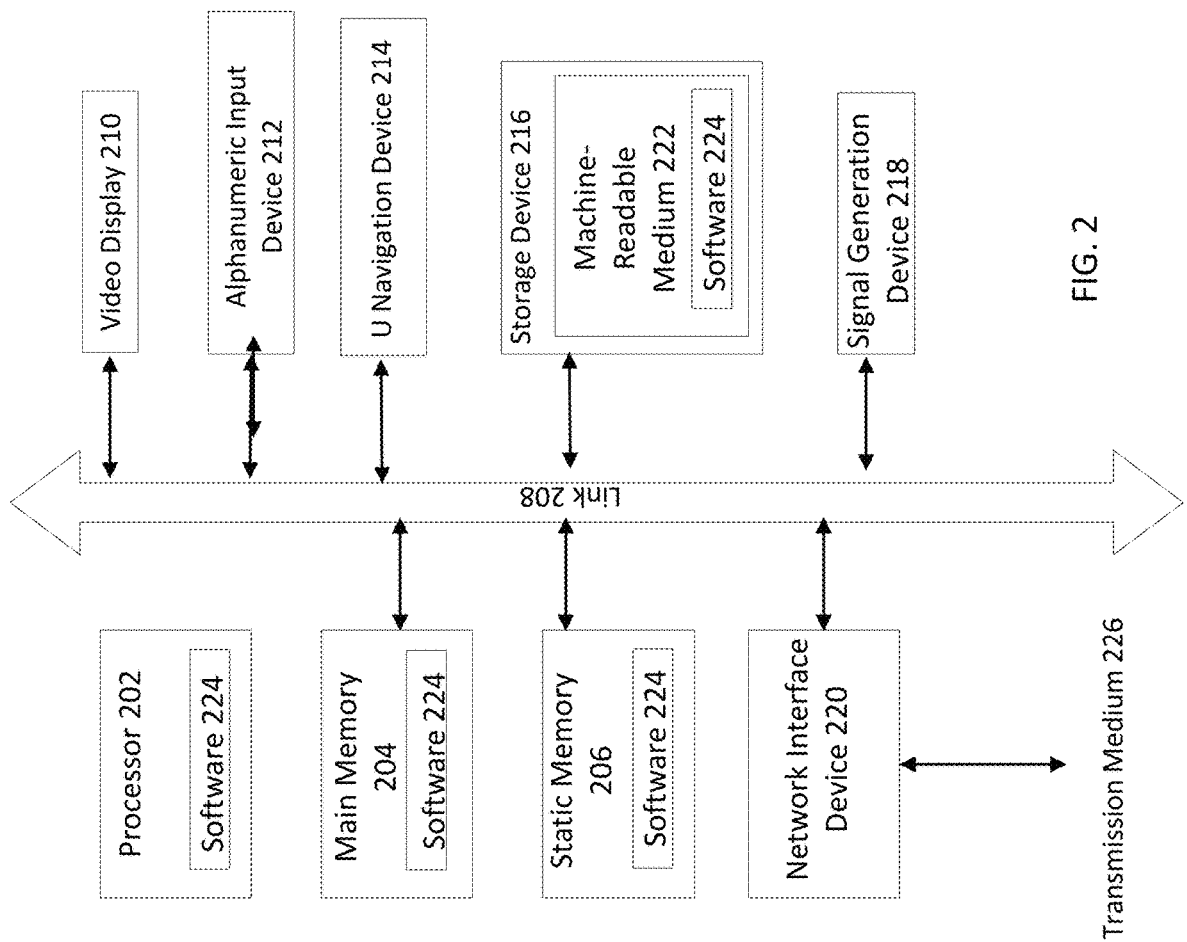
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Figure 3A:
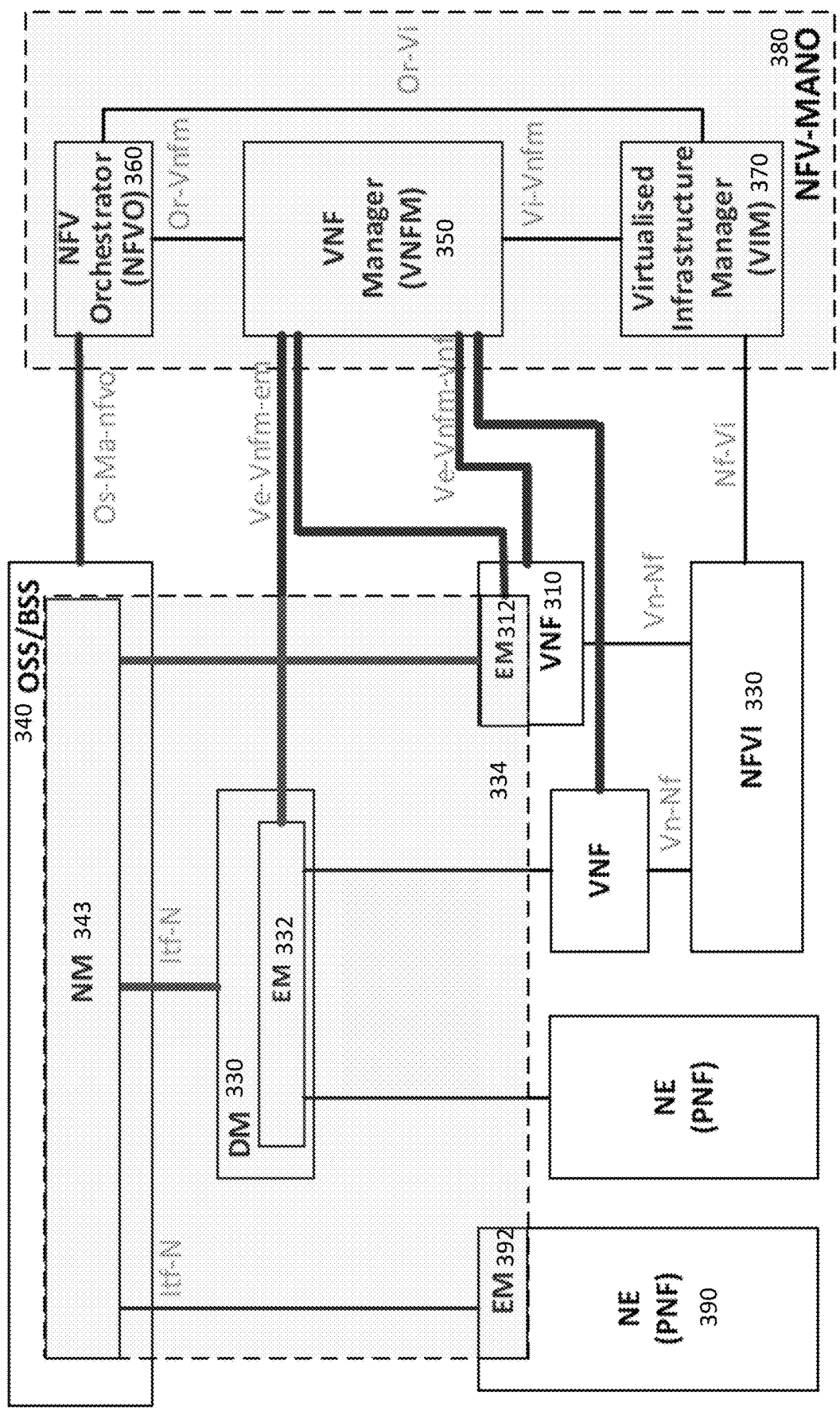
FIG. 3A illustrates a Network Function Virtualization (NFV) network management architecture in accordance with some embodiments.

FIG. 3A illustrates an NFV network management architecture in accordance with some embodiments. As illustrated, the NFV network management architecture 300 may include a number of elements (each of which may contain physical and/or virtualized components), including a Network Virtualization Function Infrastructure (NVFI) 310, Network elements (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANO, may comprise a Virtualized Infrastructure Manager (VIM) 340, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 314.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may include a Virtualized Infrastructure Manager (VIM) 370, a VNF Manager (VNFM) 350 and a NFV Orchestrator (NFVO) 360. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VIM 320 and the EMs and NMs. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 320 of the same type or of different types. Thus, although only one VNFM 350 is shown in FIG. 3A, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 310 may itself contain various virtualized and non-virtualized resources. These may include a plurality of virtual machines (VMs) 312 that may provide computational abilities (CPU), one or more memories 314 that may provide storage at either block or file-system level and one or more networking elements 316 that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a subnetwork, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OS S/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

The various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

As above, network management and network slicing are evolving towards a service-based architecture to provide different services for 5G networks. For example, the various services may include Machine Type Communication (MTC) (or internet of things (IoT)) services, enhanced Mobile Broadband (eMBB) services, and Ultra-Reliable and Low Latency Communications (URLLC) services, and vehicle-to-anything (V2X) services, among others. Network slicing is a form of virtualization that allows multiple virtual networks to run on top of a common shared physical network infrastructure. Network slicing serves service requirements by providing isolation between network resources, as well as permitting an optimized topology and specific configuration to be developed for each network slice. This permits network slicing in 5G networks to enable the orchestration and management of network slices to meet various service requirements.

Figure 3B:
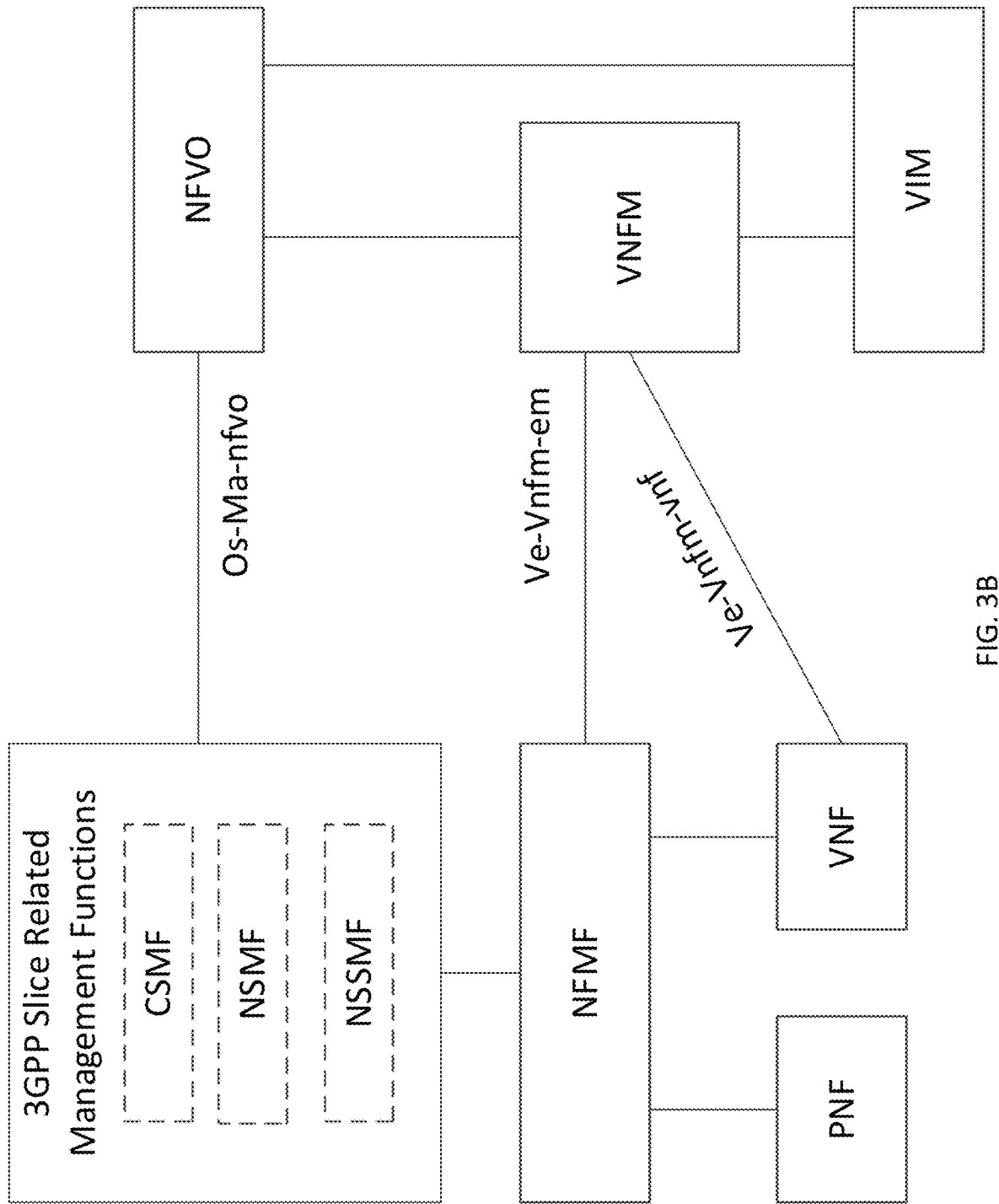
FIG. 3B illustrates network slice management in an NFV framework in accordance with some embodiments.

FIG. 3B illustrates network slice management in an NFV framework in accordance with some embodiments. As shown, a network slice may contain one or more network slice subnets. Each network slice subnet may include one or more network functions (either or both VNFs and PNFs). Network slicing management may include 3GPP slice management functions that interact with the NFVO through the Os-Ma-nfvo reference point. Similarly, the Ve-Vnfm-em reference point may be used for exchanges between NFMF and VNF Manager. The 3GPP slicing management functions include Communication Service Management Function (CSMF), Network Slice Management Function (NSMF), and Network Slice Subnet Management Function (NSSMF). The CSMF may translate the communication service-related requirement to network slice related requirements. The NSMF may be responsible for management and orchestration of the NSI and may provide communication with the NSSMF and CSMF. The NSSMF may be responsible for management and orchestration of the NSSI.

Figure 4:
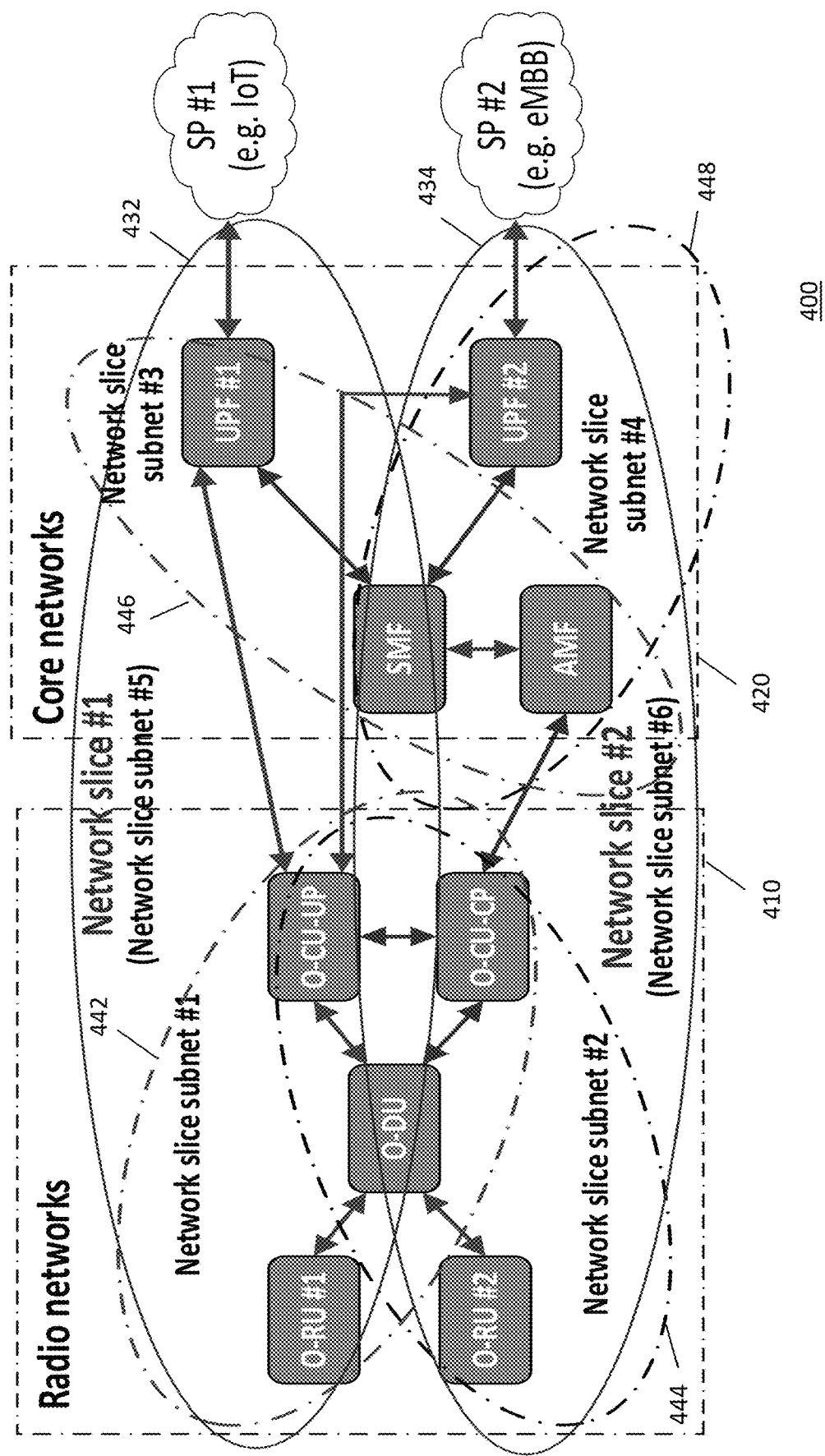
FIG. 4 illustrates a NR network with network slices in accordance with some embodiments.

FIG. 4 illustrates a NR network with network slices in accordance with some embodiments. The NR network 400 includes both the radio network (RAN) 410 and the CN 420 and contains two end-to-end network slices 432, 434 to support different services (such as IoT and eMBB services as shown) with overlapping elements of the RAN 410 and the CN 420.

Each network slice 432, 434 may contain multiple network slice subnets 442, 444, 446, 448 that are local to either the RAN 410 or the CN 420. In particular, as shown, network slice #1 432 may contain network slice subnet #1 442 for the RAN 410 and network slice subnet #3 446 for the CN 420; network slice #2 434 may contain network slice subnet #2 444 for the RAN 410 and network slice subnet #4 448 for the CN 420.

Each network slice subnets 442, 444, 446, 448 contains multiple overlapping VNFs. The VNFs may include an Open RAN (O-RAN) Central Unit (O-CU), which is a logical node hosting Radio Resource Control (RRC), Service Data Adaptation Protocol (SDAP) and Packet Data Convergence Protocol (PDCP) protocols. The O-CU includes both the O-RAN Central Unit Control Plane (O-CU-CP) and the O-RAN Central Unit User Plane (O-CU-UP), the former of which is a logical node hosting the RRC and the control plane part of the PDCP protocol and the latter of which is a logical node hosting the user plane part of the PDCP protocol and the SDAP protocol. The VNFs may also include the O-RAN Distributed Unit (O-DU), a logical node hosting high PHY layers, such as the Radio Layer Control and the Media Access Control layer (RLC/MAC) layers based on a lower layer functional split, and the O-RAN Radio Unit (O-RU), a logical node hosting Low-PHY layer and RF processing based on a lower layer functional split.

In particular, as shown, network slice subnet #1 442 may contain RAN VNFs including O-CU-CP, O-CU-UP, O-DU, and PNF R-RU #1, while network slice subnet #2 444 may contain RAN VNFs including O-CU-CP, O-CU-UP, O-DU, and PNF R-RU #2. Thus, network slice subnet #1 442 and network slice subnet #2 444 may share the O-CU-CP, O-CU-UP, O-DU VNFs, while different O-RU VNFs may be defined for each of the network slice subnets 442, 444. Similarly, network slice subnet #3 446 may contain CN VNFs including SMF, AMF, and UPF #1 while network slice subnet #4 448 may contain CN VNFs including SMF, AMF, and UPF #2. Thus, network slice subnet #3 446 and network slice subnet #4 448 may share the SMF and AMF VNFs, while different UPF VNFs may be defined for each of the network slice subnets 446, 448. The O-CU-CP of both network slice subnets #1 and #2 442, 444 may provide control plane information to the AMF to both network slice subnets #3 and #4 446, 448, while the O-CU-UP of both network slice subnets #1 and #2 442, 444 may provide user plane information to the UPF of each network slice subnet #3 and #4 446, 448.

Figure 5:
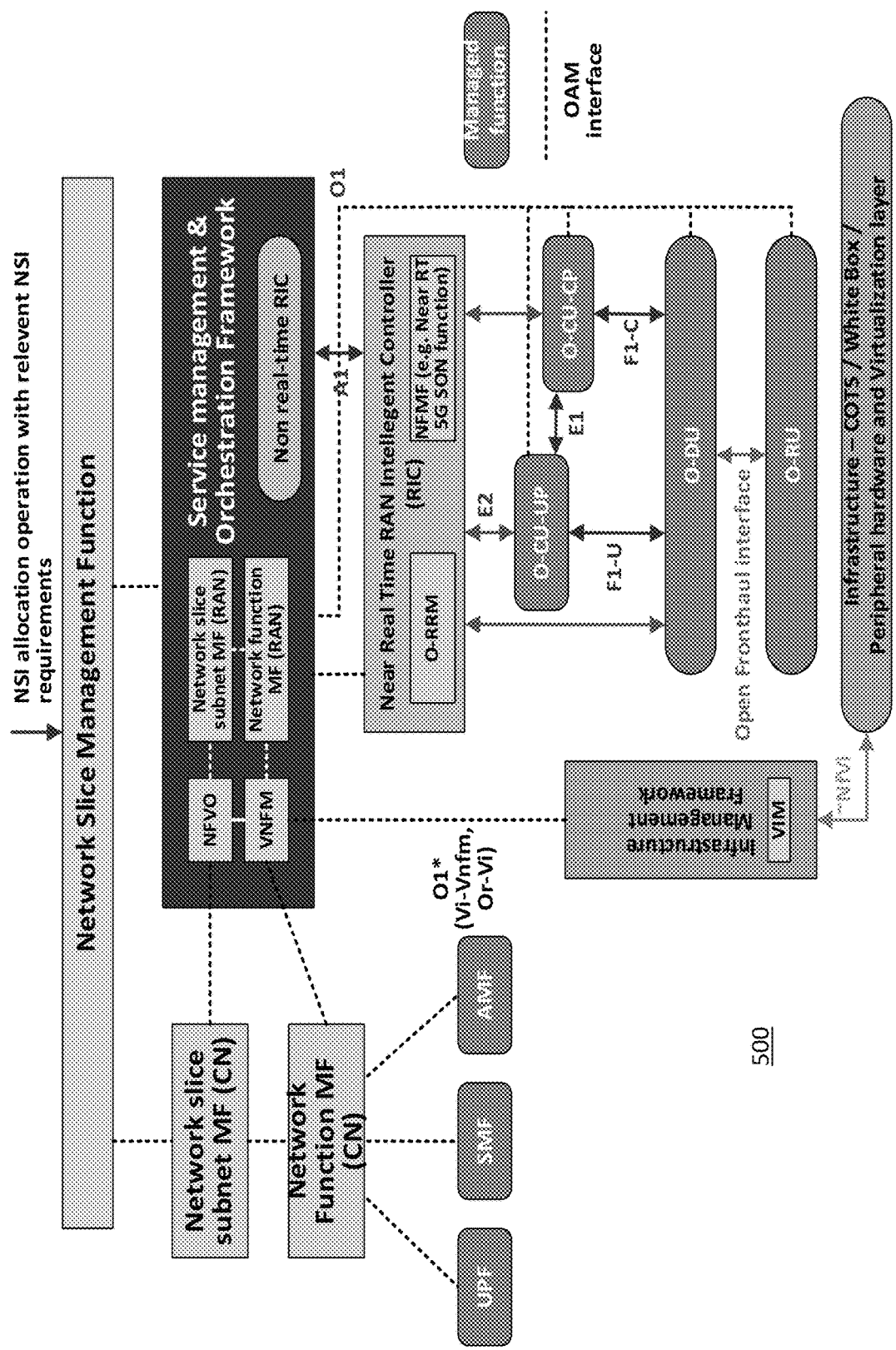
FIG. 5 illustrates a 5G Operations, Administration and Maintenance (OAM) architecture in accordance with some embodiments.

FIG. 5 illustrates a 5G Operations, Administration and Maintenance (OAM) architecture in accordance with some embodiments. The OAM architecture 500 may contain an O-RAN OAM, 3GPP management, and ETSI NFV MANO architecture. In addition to the elements described in relation to FIGS. 3A and 3B (NFVO and VNFM), the service management and orchestration (SMO) framework contains a network slice subnet managed function (NSSMF), a network function managed function (NFMF), and an O-RAN non-real-time RAN Intelligent Controller (non-RT RIC). The O-RAN non-RT RIC is a logical function that enables non-real-time control and optimization of RAN elements and resources, AI/ML workflow including model training and updates, and policy-based guidance of applications/features in near-RT RIC. In addition, the architecture 500 contains an O-RAN near-RT RIC, which is a logical function that enables near-real-time control and optimization of O-RAN elements and resources (O-CU-UP, O-CU-CP and O-DU) via fine-grained data collection and actions over the E2 interface using the O-RRM and a network function management function. The non-RT RIC may communicate with the near-RT RIC using the A1 interface. The non-RT RIC functionality may include service and policy management, RAN analytics and model-training for some of the near-RT RIC functionality, and non-RT RIC optimization.

The SMO may provide support for O-RAN network functions including Performance Management, Configuration Management, Fault Management, File Management, Communications Surveillance, Trace, PNF Discovery, and PNF Software Management. The OAM architecture 500 thus includes the near-RT RIC, O-CU-CP, O-CU-UP, O-DU, and O-RU Managed Functions, and the management side is comprised of the Service Management and Orchestration Framework (including the Non-RT RIC). The O1 interface is the interface between the Service Management and Orchestration Framework and the O-RAN managed elements. The O1* interface is the interface between the Service Management and Orchestration Framework and the Infrastructure Management Framework supporting the O-RAN virtual network functions. The Service Management and Orchestration Framework may manage and orchestrate managed elements using various interfaces. In the NFV environment, O-RAN network elements can also be implemented in a virtualized form, and thus include an infrastructure layer (e.g. COTS/White Box/Peripheral hardware and virtualization layer) and an Infrastructure Management Framework (containing a VIM).

The O-RAN network/element may be deployed on dedicated physical resources and/or virtualized resources in a specific area. The network elements may be deployed such that all of the managed elements are VNFs or such that VNFs are used for centralized functions and PNFs for functions closer to the customer, so that the near-RT RIC, O-CU-CP and O-CU-UP may be deployed as VNFs and the O-DU and O-RU deployed as PNFs. To support the O-RAN network provisioning, the Service Management and Orchestration Framework may support, for non-virtualized parts, the deployment of physical network elements on target dedicated physical resources with management through the O1 interface; for virtualized network elements, interact with the Infrastructure Management Framework to perform network element lifecycle management, e.g., instantiate the virtualized network element on the target infrastructure through the O1* interface. The Service Management and Orchestration Framework may also consume the provisioning management service through the O1 interface to manage the configuration of the network element.

The Service Management and Orchestration Framework may support O-RAN network by configuring the IP addressing in the network functions (whether virtual or physical) to support connectivity therebetween. The network can be operated and maintained dynamically through the O1 and/or O1* interface by reconfiguration of the network elements and system updates/upgrades.

As shown in FIG. 4, the O-CU-CP, O-CU-UP, and O-DU reside in (are shared by) network slice subnet #1 and network slice subnet #2. Thus, the O-CU-CP, O-CU-UP, and O-DU can be implemented as a nested network service contained in network service instances of network slice subnet #1 and network slice subnet #2. Likewise, the AMF and SMF reside in network slice subnet #3 and network slice subnet #4, and can be implemented as a nested network service. Six use cases are described, in which use cases 3-5 can be reused to create network slice #2.

Use Case 1: Orchestration and Configuration of a Nested Network Service Containing O-CU-CP/O-CU-UP/O-DU VNFs.

This use case shows the orchestration and management of a network service that can be used as a nested network service in other network service instances. The NSSMF (RAN) may create a network service descriptor (NSD) # A. The NSD may be a collection of configuration documents determining how the network service is comprised in terms of VNFs and PNFs. The NSD may contain a VNF profile and a PNF profile. The NSD # A may contain information elements, including but not limited to, a Virtual Network Function Descriptor (VNFD) for RAN VNFs (e.g., O-CU-CP, O-CU-UP, and O-DU), and relevant virtual links virtualLinkDesc. The NSSMF (RAN) may request, using an upload NSD request, that the NFVO in the SMO upload NSD # A.

The NSSMF (RAN) may then request the NFVO in the SMO create a network service identifier. The NSSMF may provide an UpdateNsRequest with parameters nsInstanceId (that contains the identifier of NSD # A), updateType="InstantiateVnf", instantiateVnfData (with parameters used for VNF instantiation), and updateTime. The NFVO in the SMO may respond to the NSSMF (RAN) about the successful creation with the parameter nsInstanceId #1. The NSSMF (RAN) may subsequently request the NFVO in the SMO to instantiate the network service identified by nsInstanceId #1.

The NFVO in the SMO may perform various operations. For example, the NFVO may request the VNFM to instantiate the O-CU-CP, O-CU-UP, and O-DU VNFs. In response the VNFM may instantiate the VNFs and notify the NFMF (RAN) that the O-CU-CP, O-CU-UP, and O-DU VNFs have been instantiated. The NFMF (RAN) may then create the Managed Object Instances (MOIs) GNBCUCPFunction, GNBCUUPFunction, and GNBDUFunction and send one or more notifications to the NSSMF (RAN) to indicate that the MOIs GNBCUCPFunction, GNBCUUPFunction, and GNBDUFunction have been created. The NFVO may respond to creation notifications by sending a notification to the NSSMF (RAN) indicating that the network service identified by nsInstanceId #1 has been instantiated.

Use Case 2: Orchestration and Configuration of a Nested Network Service Containing AMF/SMF VNFs.

This use case shows the orchestration and management of a network service that can be used as a nested network service in other network service instances. The NSSMF (CN) may first create an NSD # B that contains information elements, including but not limited to, a vnfd for CN VNFs—the AMF and SMF, and relevant virtual links virtualLinkDesc. The NSSMF (CN) may request the NFVO in the SMO to upload the NSD # B. The NSSMF (CN) may further request the NFVO in the SMO to create the network service identifier by providing the identifier of NSD # B. The NFVO in the SMO may respond to the NSSMF (CN) indicating the successful creation with the parameter nsInstanceId #2.

The NSSMF (CN), after receiving the parameter, may request the NFVO in the SMO to instantiate the network service identified by nsInstanceId #2. The NFVO in the SMO may subsequently perform various operations. For example, the NFVO may request the VNFM to instantiate the AMF and SMF VNFs. The VNFM may, in response to the request, instantiate the VNFs and notify the NFMF that the AMF and SMF VNFs have been instantiated. After receiving the instantiation notification, the NFMF (CN) may create the MOIs AMFFunction and SMFFunction and send one or more notifications to the NSSMF (CN) to indicate that the MOIs AMFFunction and SMFFunction have been created. The NFVO may respond to the MOI creation notification from the NSSMF (CN) with a notification to the NSSMF (CN) indicating that the network service identified by nsInstanceId #2 has been instantiated.

Use Case 3: Orchestration and Configuration of Network Slice #1

The network slice management function may receive the AllocateNsi operation request with network slice-related requirements from a communication service provider, and in response determine to orchestrate a network slice containing network slice subnet #1 and network slice subnet #3, as shown in FIG. 4.

In particular, the NSMF may receive the AllocateNsi operation from a communication service provider. The AllocateNsi operation may (similar to AllocateNsi operations described in other use cases) contain attributes to allocate a network slice instance, including an attributeListIn parameter that specifies the network slice related requirements (or properties) defined in the ServiceProfile (indicated in 6.3.3 of 3GPP TS 28.541, herein incorporated by reference). The NSMF may determine a new network slice instance #1 is to be created (rather than using an existing network slice instance). The ServiceProfile is a data type that represents the properties of network slice related requirements to be supported by the network slice instance in a 5G network. If the network slice related requirements allow the requested network slice instance to be shared and if an existing suitable network slice instance can be reused, the NSMF may decide to use the existing network slice instance (perhaps with modification).

The NSMF may also consume an AllocateNssi operation provided by the NSSMF (RAN) to create the network slice subnet #1, as described in use case 4 below and may consume the AllocateNssi operation provided by the NSSMF (CN) to create the network slice subnet #3, as described in use case 5 below. The NSMF may consume the AllocateNssi operation provided by the NSSMF (CN) to create the network slice subnet that will map to the network slice #1. The AllocateNssi operation may (similar to AllocateNssi operations described in other use cases) contain attributes to allocate a network slice subnet instance, including an attributeListIn parameter that specifies the network slice subnet related requirements defined in the SliceProfile (indicated in 6.3.4 of 3GPP TS 28.541). The SliceProfile is a data type that represents the properties of network slice subnet related requirements to be supported by the network slice subnet instance in a 5G network.

The NSSMF (RAN) may create an NSD # E that contains information elements, including but not limited to, nestedNsdId=the identifier of NSD # C and # D, and relevant virtual links virtualLinkDesc. The NSSMF (RAN) may request the NFVO in the SMO to upload NSD # E and create the network service identifier by providing the identifier of NSD # E. The NFVO in the SMO may respond to the NSSMF (RAN) about the successful creation with the parameter nsInstanceId #5.

The NSSMF (RAN) may then request the NFVO in the SMO instantiate the network service identified by nsInstanceId #5. The NFVO in the SMO may respond to the NSSMF (RAN) with a notification indicating the network service identified by nsInstanceId #5 has been instantiated.

The NSSMF (RAN) may then create the MOI NetworkSliceSubnet #5 that contains the NsInfo containing information of the constituent Network Slice Subnets—network slice subnet #1 and network slice subnet #3. The NSSMF (RAN) may also respond (similar to responses described in other use cases) to the NSMF with an indication having status="operationSucceed' and the NSSI identifier nSSId (that specifies the unique identifier of the allocated NSSI), and NSSI related attributes (an attributeListOut that is a list of name/value pairs contains the attributes of the allocated NSSI and the actual value assigned to each). The NSSMF (RAN) may further send one or more notifications to the NSMF to indicate the MOI NetworkSliceSubnet #5 has been created.

The NSMF may subsequently create the MOI NetworkSlice #1 that contains the nSSIId pointing to network slice subnet #5. The NSMF may respond (similar to responses described in other use cases) to the communication service provider with an indication having status="operationSucceed' and the NSI identifier nSId (that specifies the unique identifier of the allocated NSI), and NSI related attributes (an attributeListOut that is a list of name/value pairs contains the attributes of the allocated NSI and the actual value assigned to each). The NSMF may further send one or more notifications to the communication service provider to indicate that the MOI NetworkSlice #1 has been created.

Use Case 4: Orchestration and Configuration of Network Slice Subnet #1

The NSMF may consume the AllocateNssi operation provided by NSSMF (RAN) to allocate a network slice subnet instance. Upon receiving the AllocateNssi operation request with relevant NSSI information, the NSSMF (RAN) may determine to orchestrate and configure network slice subnet #1.

In particular, the NSMF may consume the AllocateNssi operation provided by the NSSMF (RAN) to allocate a network slice subnet instance. The NSMF may, in response to consumption, determine a new network slice subnet instance #1 is to be created.

The NSSMF (RAN) may create an NSD # C that contains information elements, including but not limited to, pnfd for O-RU #1, nestedNsdId=the identifier of NSD # A (provided in use case 1), and relevant virtual links virtualLinkDesc. The NSSMF (RAN) may request that the NFVO in the SMO upload NSD # C and further request the NFVO in the SMO create the network service identifier by providing the identifier of NSD # C. The NFVO in the SMO may respond to the requests from the NSSMF (RAN) by indicating to the NSSMF (RAN) the successful creation with the parameter nsInstanceId #3.

The NSSMF (RAN) may request that the NFVO in the SMO instantiate the network service identified by nsInstanceId #3, with nestedNsInstanceData=nsInstanceId #1 that was created in use case 1. The NFVO in the SMO may then respond to the NSSMF (RAN) with a notification indicating the network service identified by nsInstanceId #3 has been instantiated.

The NSSMF (RAN) may accordingly create the MOI NetworkSliceSubnet #1 that contains NsInfo containing information for VNFs O-CU-CP, O-CU-UP, O-DU, and PNF O-RU #1. The NSSMF (RAN) may respond to the NSMF with a message having a status="operationSucceed', and NSSI identifier nSSId, and NSSI related attributes. The NSSMF (RAN) may also send one or more notifications to the NSMF to indicate the MOI NetworkSliceSubnet #1 has been created. The NSSMF (RAN) may consume a modifyMOIAttributes operation at the NFMF (RAN) to configure the MOTs GNBCUCPFunction, GNBCUUPFunction, GNBDUFunction, and GNBRUFunction with network slice related information (e.g. sNSSAI list).

Use Case 5: Orchestration and Configuration of Network Slice Subnet #3

The NSMF may consume the AllocateNssi operation provided by the NSSMF (CN) to allocate a network slice subnet instance. Upon receiving the AllocateNssi operation request with relevant NSSI information, the NSSMF (CN) may determine to orchestrate and configure network slice subnet #3.

In particular, the NSMF may consume the AllocateNssi operation provided by NSSMF (CN) to allocate a network slice subnet instance. The NSSMF (CN) may, in response to consumption, determine that a new network slice subnet instance #3 is to be created.

The NSSMF (CN) may create an NSD # D that contains information elements, including but not limited to, a vnfd for UPF #1, a nestedNsdId=the identifier of NSD # B, and relevant virtual links virtualLinkDesc. The NSSMF (CN) may request the NFVO in the SMO upload NSD # D. The NSSMF (CN) may also request the NFVO in the SMO create the network service identifier by providing the identifier of NSD # D.

The NFVO in the SMO may respond to the NSSMF (CN), indicating the successful creation with the parameter nsInstanceId #4. The NSSMF (CN) may request the NFVO in the SMO to instantiate the network service identified by nsInstanceId #4, with nestedNsInstanceData=nsInstanceId #3 that was created in use case 2, above.

The NFVO in the SMO may then perform various operations. For example, the NFVO may request the VNFM instantiate the VNFs for UPF #1. The VNFM may instantiate the VNFs and notify the NFMF that the VNF of UPF #1 have been instantiated. The NFMF (CN) may create the MOIs UPFFunction and then send one or more notifications to the NSSMF (CN) to indicate that the MOIs UPFFunction have been created. The NFVO may respond to the NSSMF (CN) with a notification indicating that the network service identified by nsInstanceId #4 has been instantiated.

The NSSMF (CN) may create the MOI NetworkSlice-Subnet #3 that contains the NsInfo containing information for the VNFs AMF, SMF and UPF #1. The NSSMF (CN) may also respond to the NSMF with the status="operationSucceed', and the NSSI identifier nSSId, and NSSI related attributes. The NSSMF (CN) may further send one or more notifications to the NSMF to indicate the MOI NetworkSliceSubnet #3 has been created. The NSSMF (CN) may consume the modifyMOIAttributes operation at the NFMF (RAN) to configure MOIs AMFFunction, SMF-Function, and UPFFunction with network slice related information (e.g. sNSSAI list).

Use Case 6: 5G SON—Load Balancing Optimization

One objective of Load Balancing Optimization (LBO) is to automatically distribute user traffic among neighboring cells to ensure that radio resources are efficiently used, while providing quality end-user experience and performance. LBO may collect and analyze the load information to determine the LBO actions. The LBO actions may include UE selection, cell selection, and mobility setting. In UE selection, the gNB may select and command one or more UEs to perform handover to one or more non-congested neighboring cells. In cell selection, the gNB may direct one or more UEs to camp on less congested neighboring cells. In mobility setting, the base station may modify the handover parameters to change the coverage of a congested cell. LBO may redistribute UE traffic between DUs in the same or different O-CU, or between two different O-CUs.

In particular, the non-real time RIC in the SMO may send the performance targets of the LBO function to the near-real time RIC. The near RT RIC may operate at <1 ms and may collect cell load measurements from the O-DU and O-CU. The load measurements may include radio resources (e.g. PRB), transport network loads (e.g. on the F1, Xn, E2 . . . etc. interfaces), and virtualized resources usage of each RAN network function. The near RT RIC analyses the measurements, including comparing the LBO performance against targets to determine if a cell has been loaded, and is to be load balanced. The near RT RIC may request the O-DU and O-CU to update UE selection, cell selection and handover parameters if load balancing is desired. The near RT RIC may also request that the SMO change the virtualized resources, if desired. In response, the SMO may request that the IMF change the virtualized resources.

Thus, an apparatus of Load Balancing Optimization (LBO) management and control function, comprising one or more processors and memory configured to set a target of a distributed LBO function, activate the distributed LBO function; receive a performance measurements used to evaluate distributed LBO performance, analyze the performance measurements, and perform actions to balance traffic load among neighboring gNBs if the distributed LBO performance does not meet the target. The performance measurements include one or more of a number of radio resource control (RRC) connection establishments and/or releases, abnormal releases, handover failures, and call drops. The actions include one or more of updating the targets for distributed LBO function, disabling the distributed LBO function, determining the actions to optimize the traffic load distributions among neighboring cells, configuring handover and/or reselection parameters of each cell or neighbors of the cell, and initiation of changing virtualized resources.

Figure 6:
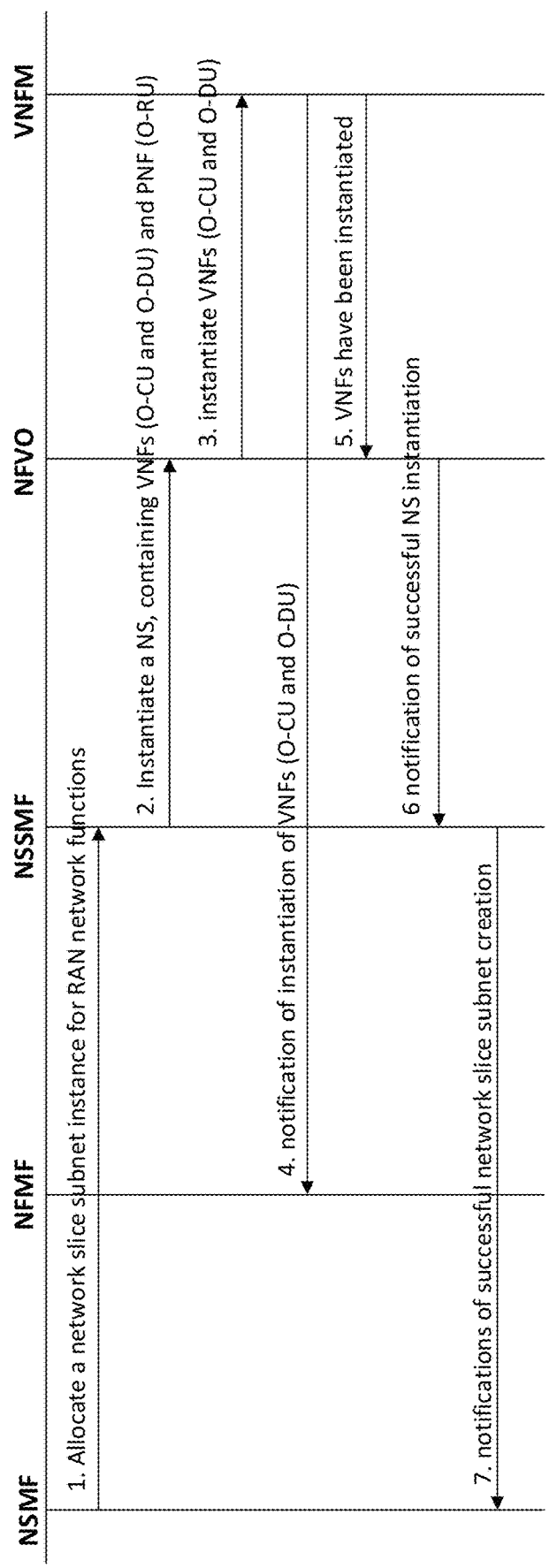
FIG. 6 illustrates a high level view of network slice subnet instance creation in accordance with some embodiments.

FIG. 6 illustrates a high level view of network slice subnet instance creation in accordance with some embodiments. Although some operations are shown in FIG. 6, additional steps may be used that are not shown. As shown, at operation 1, the NSMF may send a request to the NSSMF to allocate a NSSI for RAN network functions, e.g. O-CU, O-DU, and O-RU.

In response, at operation 2, the NSSMF may decide to instantiate a NS instance for a new NSSI. The NSSMF may send a request for instantiation to the NFVO via the Os-Manfvo reference point. In some embodiments, the NSSMF may request instantiation of an NS instance with VNFs for the O-CU and O-DU, and a PNF for the O-RU.

At operation 3, the NFVO may send a request to the VNFM to instantiate the VNFs for the O-CU and O-DU. The VNFM, in turn, may instantiate the VNFs for the O-CU and O-DU.

The VNFM may then at operation 4 notify the NFMF via the Ve-Vnfm-vnf that the VNFs have been instantiated. The VNFM may also respond at operation 5 to the NFVO informing the NFVO that the desired VNFs have been instantiated.

The NFVO may, in turn, at operation 6 notify the NSSMF that the NS has been instantiated. The NSSMF may then respond to the NSMF at operation 7 with a status equal to success for the operation of network slice subnet instance creation.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a New Radio (NR) network configured to operate as a network slice management function (NSMF), the apparatus comprising: memory and processing circuitry configured to:
   receive a first AllocateNSI operation with attributes to allocate a network slice instance (NSI), the first AllocateNSI operation including an attributeListIn parameter that specifies network slice properties in a ServiceProfile to be supported by the NSI;
   determine, in response to reception of the first AllocateNSI operation, that a new NSI is to be created rather than using an existing NSI; and
   communicate with a network slice subnet management function (NSSMF) to create the new NSI, the new NSI including an open radio access network (O-RAN) central unit (O-CU), an O-RAN distributed unit (O-DU), and an O-RAN Radio Unit (O-RU).

2. The apparatus of claim 1, wherein the memory and processing circuitry are further configured to communicate with the NSSMF to create a network slice subnet instance (NSSI) that contains the O-CU and O-DU as virtual network functions (VNFs) and the O-RU as a physical network function (PNF).

3. The apparatus of claim 1, wherein the memory and processing circuitry are further configured to:
   determine that the new NSI is to contain a RAN network slice subnet instance (NSSI) and a core network (CN) NSSI; and
   communicate with a radio access network (NSSMF (RAN)) of the NSSMF to create the RAN NSSI and a NSSMF for a core network (NSSMF (CN)) to create the CN NSSI.

4. The apparatus of claim 3, wherein the memory and processing circuitry are further configured to:
   consume a second AllocateNssi operation provided by the NSSMF (RAN) to allocate the RAN NSSI;
   consume a third AllocateNssi operation provided by the NSSMF (CN) to allocate the CN NSSI; and
   receive a response from the NSSMF (RAN) and the NSSMF (CN) indicating that the RAN NSSI and CN NSSI, respectively, has been successfully created.

5. The apparatus of claim 4, wherein the response from the NSSMF (RAN) and the NSSMF (CN) each provides an NSSI identifier and NSSI-related attributes of the RAN NSSI and CN NSSI, respectively.

6. The apparatus of claim 3, wherein the memory and processing circuitry are further configured to:
allocate another NSSI that maps to the new NSI in response to consumption of the second and third AllocateNssi operation.

7. The apparatus of claim 6, wherein the memory and processing circuitry are further configured to:
create a Managed Object Instance (MOI) containing an NSSI Id that points to the other NSSI; and
respond to the first AllocateNSI operation indicating creation of the MOI.

8. The apparatus of claim 6, wherein the memory and processing circuitry are further configured to:
respond to the first AllocateNSI operation indicating that the NSI has been successfully created, an NSI identifier of the new NSI, and NSI-related attributes of the new NSI.

9. An apparatus of a New Radio (NR) network configured to operate as a network slice subnet management function (NSSMF), the apparatus comprising: memory and processing circuitry configured to:
receive, from a network slice management function (NSMF), an AllocateNSSI operation with attributes for a network slice subnet instance (NSSI);
determine, in response to reception of the AllocateNSSI operation, that a new NSSI is to be created rather than using an existing NSSI; and
create the new NSSI in response to a determination that the new NSSI is to be created, the new NSSI including, if the NSSMF is a radio access network (RAN) NSSMF: an open radio access network (O-RAN) central unit (O-CU), an O-RAN distributed unit (O-DU), and an O-RAN Radio Unit (O-RU).

10. The apparatus of claim 9, wherein for the RAN NSSMF the processing circuitry and memory are further configured to:
create a Network Service Descriptor (NSD) that includes information for a Physical Network Function (PNF) and Virtual Network Functions (VNFs);
request, by providing the NSD, a network function virtualization (NFV) Orchestrator (NFVO) to upload the NSD and create a Network Service (NS) identifier based on the NSD;
receive a NS identifier response from the NFVO containing the NS identifier to indicate successful creation of the NS identifier;
request the NFVO instantiate a NS identified by the NS identifier; and
receive a NS response from the NFVO indicating successful creation of the NS identified by the NS identifier.

11. The apparatus of claim 10, wherein for the RAN NSSMF the processing circuitry and memory are further configured to:
create, in response to reception of the NS response, a Managed Object Instance (MOI) containing information for the PNF and VNFs;
respond to the NSMF, after creation of the MOI, indicating success of creation of the new NSSI, an NSSI identifier of the new NSSI, and NSSI-related attributes of the new NSSI; and
send at least one notification to the NSMF to indicate creation of the MOI.

12. The apparatus of claim 11, wherein for the RAN NSSMF the processing circuitry and memory are further configured to:
consume a modifyMOIAttributes operation to configure MOIs GNBCUCPFunction, GNBCUUPFunction, GNBDUFunction, and GNBRUFunction with information of the new NSSI.

13. The apparatus of claim 10, wherein for the RAN NSSMF:
the O-RU is the PNF,
the VNFs include the O-DU and an O-CU control plane (O-CU-CP) and an O-CU user plane (O-CU-UP) of the O-CU, and
the NSD contains a Physical Network Function Descriptor (PNFD) for the PNF, a nested NSD identifier that contains NSD identifiers for the VNFs, and virtual links between the PNF and VNFs.

14. The apparatus of claim 9, wherein, if the NSSMF is a core network (CN) NSSMF:
the new NSSI includes a User Plane Function (UPF), an Access and Mobility Function (AMF), and a Session Management Function (SMF), and
the processing circuitry and memory are further configured to:
create a Network Service Descriptor (NSD) that includes information for Virtual Network Functions (VNFs);
request, by providing the NSD, a network function virtualization (NFV) Orchestrator (NFVO) to upload the NSD and create a Network Service (NS) identifier based on the NSD;
receive a NS identifier response from the NFVO containing the NS identifier to indicate successful creation of the NS identifier;
request the NFVO instantiate a NS identified by the NS identifier; and
receive a NS response from the NFVO indicating successful creation of the NS identified by the NS identifier.

15. The apparatus of claim 14, wherein for the CN NSSMF:
the VNFs include the AMF, SMF and UPF, and
the NSD contains a Virtual Network Function Descriptor (VNFD) for the UPF, a nested NSD identifier that contains NSD identifiers for the AMF and SMF, and virtual links between the VNFs.

16. The apparatus of claim 15, wherein for the CN NSSMF the processing circuitry and memory are further configured to:
create, in response to reception of the NS response, a Managed Object Instance (MOI) containing information for the VNFs;
respond to the NSMF, after creation of the MOI, indicating success of creation of the new NSSI, an NSSI identifier of the new NSSI, and NSSI-related attributes of the new NSSI; and
send at least one notification to the NSMF to indicate creation of the MOI.

17. The apparatus of claim 16, wherein for the CN NSSMF the processing circuitry and memory are further configured to:
consume a modifyMOIAttributes operation to configure MOIs AMFFunction, SMFFunction, and UPFFunction with information of the new NSSI.

18. A non-transitory computer-readable storage medium that stores instructions for execution by a network slice management function (NSMF) for a New Radio (NR) network, the instructions when executed configure one or more processors to:

receive a first AllocateNSI operation with attributes to allocate a network slice instance (NSI), the first AllocateNSI operation including an attributeListIn parameter that specifies network slice properties in a Service Profile to be supported by the NSI;

determine, in response to reception of the first AllocateNSI operation, that a new NSI is to be created rather than using an existing NSI, the new NSI containing a radio access network (RAN) network slice subnet instance (NSSI) and a core network (CN) NSSI; and communicate with a RAN network slice subnet management function (NSSMF (RAN)) and a CN NSSMF (NSSMF (CN)) to create the new NSI, the new NSI comprising virtual network functions (VNFs) that include an open radio access network (O-RAN) central unit (O-CU) and an O-RAN distributed unit (O-DU), and a physical network function (PNF) that includes an O-RAN Radio Unit (O-RU).

19. The non-transitory computer-readable storage medium of claim 18, wherein the instructions when executed further configure the one or more processors to:

consume a second AllocateNssi operation provided by the NSSMF (RAN) to allocate the RAN NSSI;

consume a third AllocateNssi operation provided by the NS SMF (CN) to allocate the CN NSSI; and receive a response from the NS SMF (RAN) and the NSSMF (CN) indicating that the RAN NSSI and CN NSSI, respectively, has been successfully created.

20. The non-transitory computer-readable storage medium of claim 19, wherein the instructions when executed further configure the one or more processors to:

allocate another NS SI that maps to the new NSI in response to consumption of the third AllocateNssi operation;

create a Managed Object Instance (MOI) containing an NSSI Id that points to the other NSSI;

respond to the first AllocateNSI operation indicating creation of the MOI; and respond to the first AllocateNSI operation indicating that the NSI has been successfully created, an NSI identifier of the new NSI, and NSI-related attributes of the new NSI.

* * * * *